(12) United States Patent
Nattinger et al.

(10) Patent No.: US 11,151,792 B2
(45) Date of Patent: Oct. 19, 2021

(54) SYSTEM AND METHOD FOR CREATING PERSISTENT MAPPINGS IN AUGMENTED REALITY

(71) Applicant: Google LLC, Mountain View, CA (US)

(72) Inventors: Elena Nattinger, San Carlos, CA (US); Seth Raphael, Portland, OR (US); Austin McCasland, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/396,145

(22) Filed: Apr. 26, 2019

(65) Prior Publication Data
US 2020/0342670 A1    Oct. 29, 2020

(51) Int. Cl.
*G06T 19/00*    (2011.01)
*G06K 9/00*    (2006.01)

(52) U.S. Cl.
CPC ........ *G06T 19/006* (2013.01); *G06K 9/00671* (2013.01)

(58) Field of Classification Search
CPC .......................... G06T 19/006; G06K 9/00671
See application file for complete search history.

(56) References Cited

U.S. PATENT DOCUMENTS

| | | |
|---|---|---|
| 9,911,238 B2 | 3/2018 | Doronichev et al. |
| 10,012,505 B2 | 7/2018 | Dayal et al. |
| 10,037,699 B1 | 7/2018 | Toyoda et al. |
| 10,482,674 B1 | 11/2019 | Wu et al. |
| 2004/0113935 A1 | 6/2004 | O'Neal et al. |
| 2005/0160368 A1 | 7/2005 | Liu et al. |
| 2010/0045701 A1 | 2/2010 | Scott et al. |
| 2010/0203868 A1 | 8/2010 | Sagie et al. |
| 2011/0121068 A1 | 5/2011 | Emanuel et al. |
| 2011/0221771 A1 | 9/2011 | Cramer et al. |
| 2012/0108332 A1 | 5/2012 | Baseley et al. |
| 2012/0164938 A1 | 6/2012 | Jeong et al. |

(Continued)

FOREIGN PATENT DOCUMENTS

| | | |
|---|---|---|
| WO | 2015016798 A2 | 2/2015 |
| WO | 2016191719 A1 | 12/2016 |

OTHER PUBLICATIONS

Wang et al. "Simultaneous Localization, Mapping and Moving Object Tracking" Journal of Robotics, 2007 (Year: 2007).*

(Continued)

*Primary Examiner* — Kee M Tung
*Assistant Examiner* — Khoa Vu
(74) *Attorney, Agent, or Firm* — Brake Hughes Bellermann LLP

(57) ABSTRACT

According to an aspect, a method for creating a three-dimensional map for augmented reality (AR) localization includes obtaining a digital representation of a scene of an AR environment, where the digital representation has been captured by a computing device. The method includes identifying, using a machine learning (ML) model, a region of the digital representation having visual data identified as likely to change, and removing a portion of the digital representation that corresponds to the region of the digital representation to obtain a reduced digital representation, where the reduced digital representation is used to generate a three-dimensional (3D) map for the AR environment.

14 Claims, 11 Drawing Sheets

(56) References Cited

U.S. PATENT DOCUMENTS

| | | |
|---|---|---|
| 2012/0218300 A1 | 8/2012 | Hayakawa |
| 2012/0249528 A1 | 10/2012 | Park et al. |
| 2013/0002717 A1 | 1/2013 | Deffeyes et al. |
| 2013/0083066 A1 | 4/2013 | Aoki et al. |
| 2013/0141461 A1 | 6/2013 | Salter et al. |
| 2013/0155108 A1 | 6/2013 | Williams et al. |
| 2013/0215148 A1 | 8/2013 | Antonyuk et al. |
| 2013/0271560 A1 | 10/2013 | Diao et al. |
| 2013/0290421 A1 | 10/2013 | Benson et al. |
| 2014/0046829 A1 | 2/2014 | Serban et al. |
| 2014/0089850 A1 | 3/2014 | Gorstan et al. |
| 2014/0111544 A1 | 4/2014 | Hammond |
| 2014/0210856 A1 | 7/2014 | Finn et al. |
| 2014/0215356 A1 | 7/2014 | Brander et al. |
| 2014/0241599 A1 | 8/2014 | Chen et al. |
| 2015/0023602 A1 | 1/2015 | Wnuk et al. |
| 2015/0029180 A1 | 1/2015 | Komatsu |
| 2015/0046822 A1 | 2/2015 | Tokash et al. |
| 2015/0062120 A1* | 3/2015 | Reisner-Kollmann ............ G06T 19/006 345/419 |
| 2015/0070391 A1 | 3/2015 | Nishimaki et al. |
| 2015/0116355 A1 | 4/2015 | Hofmann et al. |
| 2015/0127486 A1 | 5/2015 | Advani |
| 2015/0301787 A1 | 10/2015 | Greco et al. |
| 2015/0302645 A1 | 10/2015 | Takeuchi |
| 2015/0302649 A1 | 10/2015 | Komatsu |
| 2015/0331576 A1 | 11/2015 | Vinayak et al. |
| 2016/0048964 A1 | 2/2016 | Kruglick |
| 2016/0063327 A1 | 3/2016 | Yasutake |
| 2016/0063764 A1 | 3/2016 | Okamoto et al. |
| 2016/0180536 A1 | 6/2016 | Yamaguchi |
| 2016/0300392 A1 | 10/2016 | Jonczyk et al. |
| 2016/0335275 A1 | 11/2016 | Williams et al. |
| 2016/0337599 A1 | 11/2016 | Williams et al. |
| 2017/0061692 A1 | 3/2017 | Giraldi et al. |
| 2017/0186235 A1 | 6/2017 | Chu |
| 2017/0206691 A1 | 7/2017 | Harrises et al. |
| 2017/0337735 A1 | 11/2017 | Goslin |
| 2017/0345167 A1 | 11/2017 | Ard et al. |
| 2018/0025544 A1 | 1/2018 | Schoeller et al. |
| 2018/0135986 A1 | 5/2018 | Dayal et al. |
| 2018/0260020 A1 | 9/2018 | Kamhi et al. |
| 2018/0270631 A1 | 9/2018 | High et al. |
| 2019/0065027 A1 | 2/2019 | Hauenstein et al. |
| 2019/0114802 A1 | 4/2019 | Lazarow |
| 2019/0156577 A1 | 5/2019 | Barros et al. |
| 2019/0178654 A1* | 6/2019 | Hare .................. G06T 7/70 |
| 2019/0220665 A1* | 7/2019 | Neumann .......... G06Q 30/0623 |
| 2019/0221030 A1 | 7/2019 | Griffin et al. |
| 2019/0295315 A1* | 9/2019 | Levinson ............... G06T 17/20 |
| 2019/0333275 A1 | 10/2019 | Wang et al. |
| 2019/0354699 A1* | 11/2019 | Pekelny .................. G06F 21/35 |
| 2020/0104028 A1 | 4/2020 | Vats |
| 2020/0249819 A1* | 8/2020 | Berquam ............... G06F 3/011 |
| 2020/0311428 A1 | 10/2020 | Rom |

OTHER PUBLICATIONS

Wangsiripitak et al. "Avoiding moving outliers in visual SLAM by tracking moving object", IEEE, 2009 (Year: 2009).*

"ARCore overview", Feb. 28, 2019, 3 pages.

"Share AR Experiences with Cloud Anchors", Feb. 28, 2019, 3 pages.

International Search Report and Written Opinion for PCT Application No. PCT/US2019/065235, dated Jul. 27, 2020, 15 pages.

International Search Report and Written Opinion for PCT Application No. PCT/US2019/065239, dated Jul. 30, 2020, 13 pages.

Invitation to Pay Additional Fees and Partial International Search for Application No. PCT/US2019/065235, dated Jun. 3, 2020, 10 pages.

Invitation to Pay Additional Fees and Partial International Search for Application No. PCT/US2019/065239, dated Jun. 2, 2020, 8 pages.

"Detecting Images in an AR Experience", Apple Developer Documentation, retrieved on Jul. 1, 2020 from https://developer.apple.com/documentation/arkit/detecting_images_in_an_ar_experience, 5 pages.

Persson, et al., "Learning Actions to Improve the Perceptual Anchoring of Objects", Frontiers in Robotics and AI, vol. 3, Article 76, Jan. 30, 2017, 17 pages.

Sun, et al., "Motion Removal for Reliable RGB-D Slam in Dynamic Environments", Robotics and Autonomous Systems, vol. 108, Oct. 1, 2018, pp. 115-128.

Wang, et al., "Coarse Semantic-Based Motion Removal for Robust Mapping in Dynamic Environments", IEEE Access, vol. XX, retrieved on Jul. 1, 2020 from https://www.researchgate.net/publication/340821111_Coarse_Semantic-based_motion_Removal_for_Robust_Mapping_in_Dynamic_Environments, 2017, 17 pages.

Wang, "Simultaneous Localization, Mapping and Moving Object Tracking", The International Journal of Robotics Research, vol. 26, No. 9, Sep. 1, 2007, 164 pages.

Yang, et al., "Robust RGB-D Slam in Dynamic Environment Using Faster R-CNN", 3rd IEEE International Conference on Computer and Communications (ICCC), Dec. 1, 2017, pp. 2398-2402.

* cited by examiner

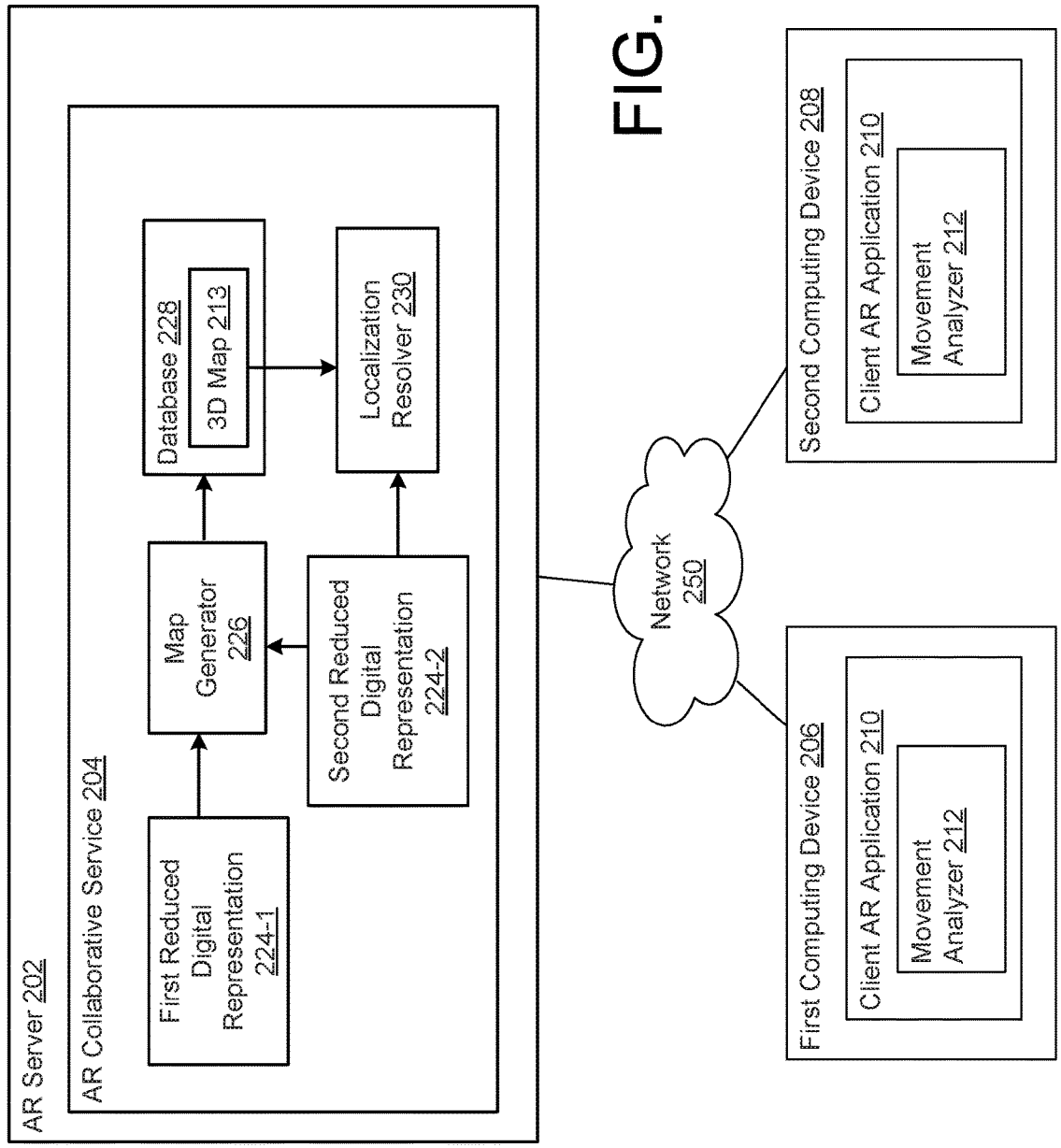

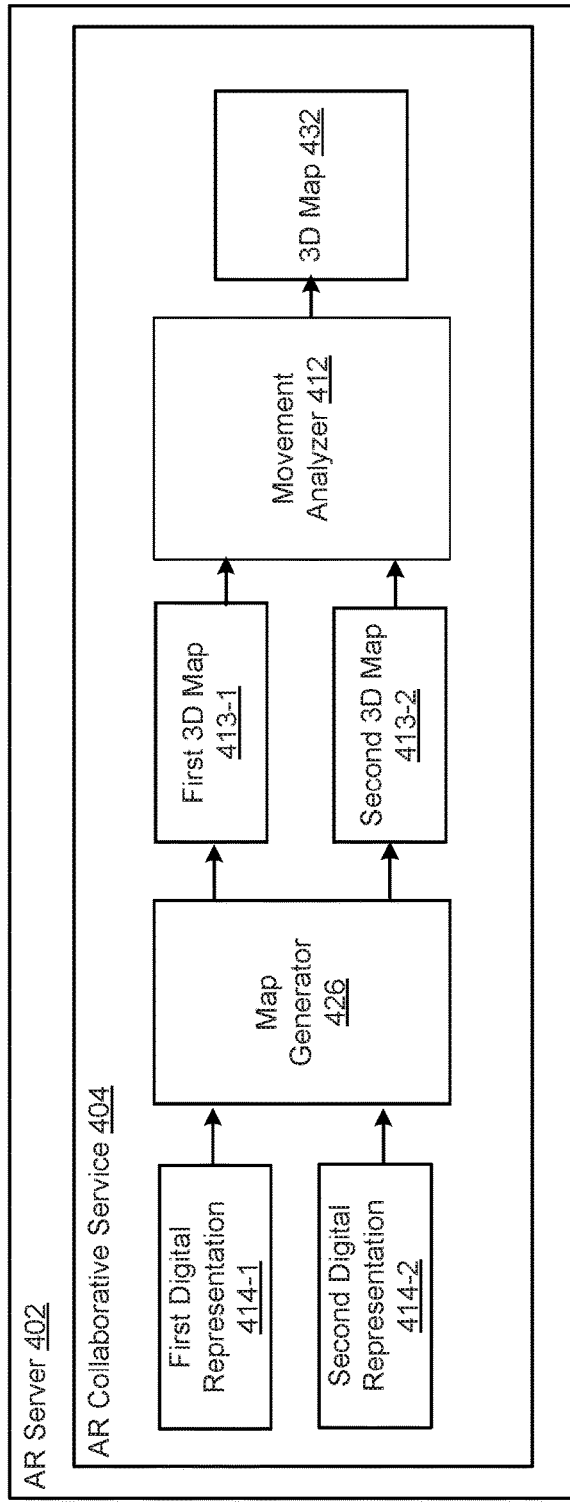
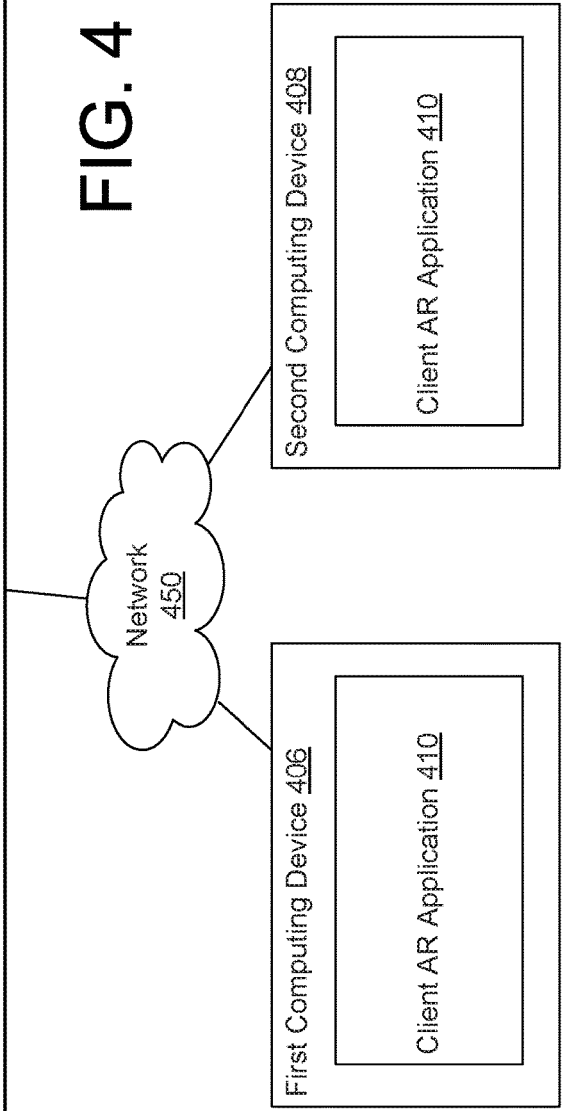
FIG. 4

SYSTEM AND METHOD FOR CREATING PERSISTENT MAPPINGS IN AUGMENTED REALITY

RELATED APPLICATION

This application is related to U.S. patent application Ser. No. 16/395,832, filed on Apr. 26, 2019, entitled "Managing Content in Augmented Reality", which is incorporated by reference in its entirety.

TECHNICAL FIELD

This description generally relates to the creating of persistent mappings in augmented reality.

BACKGROUND

In some augmented reality (AR) systems, an AR server may receive digital information about a first user's environment, and a three-dimensional (3D) mapping that represents an AR environment is created. The 3D mapping may provide a coordinate space in which visual information and AR objects are positioned. In response to an attempt to localize the AR environment on a second user's computing device, the 3D mapping may be compared against digital information about the second user's environment. However, one or more physical objects in the physical space may have moved at the time of the second user's attempt to localize the AR environment. Therefore, despite the second user being in the same physical space, the comparison may fail because of the visual differences between the 3D mapping and the digital information received from the second user's device.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

According to an aspect, a method for creating a three-dimensional map for augmented reality (AR) localization includes obtaining a digital representation of a scene of an AR environment, where the digital representation has been captured by a computing device. The method includes identifying, using a machine learning (ML) model, a region of the digital representation having visual data identified as likely to change (e.g., move from the scene, disappear from the scene or other cause a change to the scene over time), and removing a portion of the digital representation that corresponds to the region of the digital representation to obtain a reduced digital representation, where the reduced digital representation is used to generate a three-dimensional (3D) map for the AR environment.

According to some aspects, the method may include any of the following features (or any combination thereof). The method may include generating the 3D map based on the reduced digital representation, where the 3D map does not include the portion of the digital representation that corresponds to the region with the visual data identified as likely to change. The identifying may include detecting, using the ML model, a visual object in the digital representation that is likely to change, where the region of the digital representation is identified based on the detected visual object. The identifying may include detecting, using the ML model, a visual object in the digital representation, classifying the visual object into a classification, and identifying the visual object as likely to change based on a tag associated with the classification, where the tag indicates that objects belonging to the classification are likely to change, and the region of the digital representation is identified as a three-dimensional space that includes the object identified as likely to change. The identifying may include identifying, using the ML model, a pattern of visual points in the digital representation that are likely to change, where the pattern of visual points are excluded from the 3D map. The digital representation includes a set of visual feature points derived from the computing device, and the method includes detecting a visual object that is likely to change based on the digital representation, identifying a region of space that includes the visual object, and removing one or more visual feature points from the set that are included within the region. The digital representation is a first digital representation, and the computing device is a first computing device, and the method includes obtaining a second digital representation of at least a portion of the scene of the AR environment, where the second digital representation has been captured by a second computing device, and comparing the second digital representation with the 3D map to determine whether the second digital representation is from the same AR environment as the 3D map. The method may include obtaining a second digital representation of at least a portion of the scene of the AR environment, identifying, using the ML model, a secondary region of the second digital representation, where the secondary region has visual data identified as likely to change, removing a portion of the second digital representation that corresponds to the secondary region, and comparing the second digital representation with the 3D map to determine whether the second digital representation is from the same AR environment as the 3D map.

According to an aspect, an augmented reality (AR) system configured to generate a three-dimensional (3D) map for an AR environment includes an AR collaborative service executable by at least one server, and a client AR application executable by a computing device, where the client AR application configured to communicate with the AR collaborative service via one or more application programming interfaces (APIs), and the AR collaborative service or the client AR application configured to obtain a digital representation of a scene of an AR environment, where the digital representation has been captured by the computing device, identify, using a machine learning (ML) model, a region of the digital representation having visual data that is identified as likely to change, and remove a portion of the digital representation that corresponds to the region to obtain a reduced digital representation of the scene, where the reduced digital representation is used for comparison with a three-dimensional (3D) map of the AR environment.

According to some aspects, the AR system may include any of the above/below features (or any combination thereof). The AR collaborative service is configured to compare the reduced digital representation with the 3D map in response to an attempt to localize the AR environment on the computing device. The client AR application or the AR collaborative service is configured to detect, using the ML model, an object in the digital representation that is likely to move, where the region of the digital representation is identified based on the detected object. The AR collaborative service is configured to detect, using the ML model, an object in the digital representation, classify the object into a classification, and identify the object as likely to move based on a tag associated with the classification, where the tag indicates that objects belonging to the classification are likely to move. The client AR application is configured to identify, using the ML model, a pattern of visual points in the digital representation that are likely to move. The digital representation includes a set of visual feature points captured by the computing device, and the client AR application or the AR collaborative service is configured to detect an object that is likely to move based on the digital representation, identify a region of space that includes the object, and remove one or more visual feature points from the set that are included within the region.

According to an aspect, a non-transitory computer-readable medium storing executable instructions that when executed by at least one processor are configured to generate a three-dimensional (3D) for an augmented reality (AR) environment, where the executable instructions includes instructions that cause the at least one processor to obtain a first digital representation of a scene of an AR environment, where the first digital representation has been captured by a first computing device, identify, using a machine learning (ML) model, a region of the first digital representation having visual data that is identified as likely to change, remove a portion of the first digital representation that corresponds to the region to obtain a reduced digital representation, generate a three-dimensional (3D) map for the AR environment for storage on an AR server, and compare a second digital representation of at least a portion of the scene with the 3D map in response to an attempt to localize the AR environment on a second computing device, where the second digital representation has been captured by the second computing device.

According to some aspects, the non-transitory computer-readable medium may include any of the above/below features (or any combination thereof). The operations may include detect, using the ML model, an object in the first digital representation that is likely to move. The operations may include detect, using the ML model, an object in the first digital representation, classify the object into a classification, and identify the object as likely to move based on a tag associated with the classification, where the tag indicates that objects belonging to the classification are likely to move, and the region of the first digital representation is identified as a three-dimensional space that includes the object identified as likely to move. The operations may include identify, using the ML model, a pattern of points in the first digital representation that are likely to move, where the pattern of points are excluded from the 3D map. The digital representation includes a set of visual feature points captured by the first computing device, and the operations may include detect an object that is likely to move based on the first digital representation, identify a region of space that includes the object, and remove one or more visual feature points from the set that are included within the region. The operations may include detect, using the ML model, an object in the second digital representation that is likely to move.

The details of one or more implementations are set forth in the accompanying drawings and the description below. Other features will be apparent from the description and drawings, and from the claims.

BRIEF DESCRIPTION OF THE DRAWINGS

FIG. 2 illustrates an AR system with the movement analyzer integrated on a client AR application according to an aspect.

FIG. 4 illustrates an AR system for generating a 3D mapping without movable data according to an aspect.

Like reference symbols in the various drawings indicate like elements.

DETAILED DESCRIPTION

The embodiments provide an AR system configured to create a 3D map for an AR environment without one or more visual objects (or one or more sets of patterned visual points) that are identified as likely to change (e.g., move from the scene, disappear from the scene, or a cause a change to the scene). In some examples, the 3D map includes the objects that are identified as likely to change, but the objects that are identified as likely to change are annotated in the AR system. The annotation of movable objects may indicate that these objects are not used in AR localization comparison operations. For example, the AR system detects or identifies data that is likely is move from the digital information about a first user's environment captured by the first user's computing device, and then removes or annotates that data before updating or generating the 3D map. In addition, in an attempt to localize the AR environment on a second user's computing device, the AR system may remove or ignore movable data from the digital information captured the second user's computing device when comparing the second user's digital information to the 3D map.

In some examples, the AR environment uses machine learning models to semantically understand the type of physical object in the scene of the AR environment, and detects whether that object is likely to move. If the object is determined as likely to move, that portion of the digital information is not used to create/update the 3D map or not used in the comparison with the 3D map for AR localization. As a result, the quality of persistent world-space mapping of AR systems may be increased. In addition, the accuracy of the comparison for AR localization may be improved since relatively stationary objects are used as opposed to objects that are likely to move.

Figure 1A:
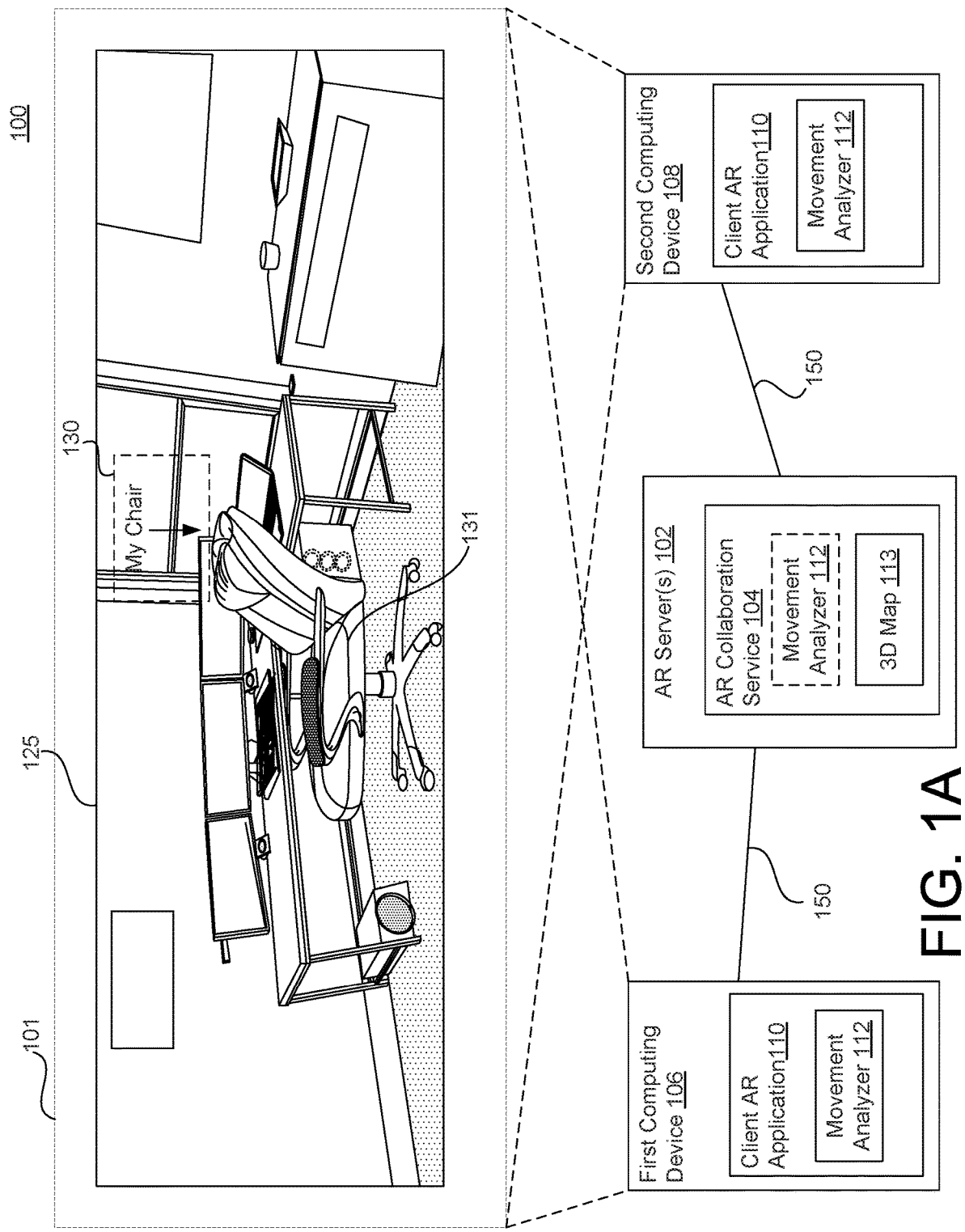
FIG. 1A illustrates an AR system for creating a 3D map according to an aspect.
Figure 1B:
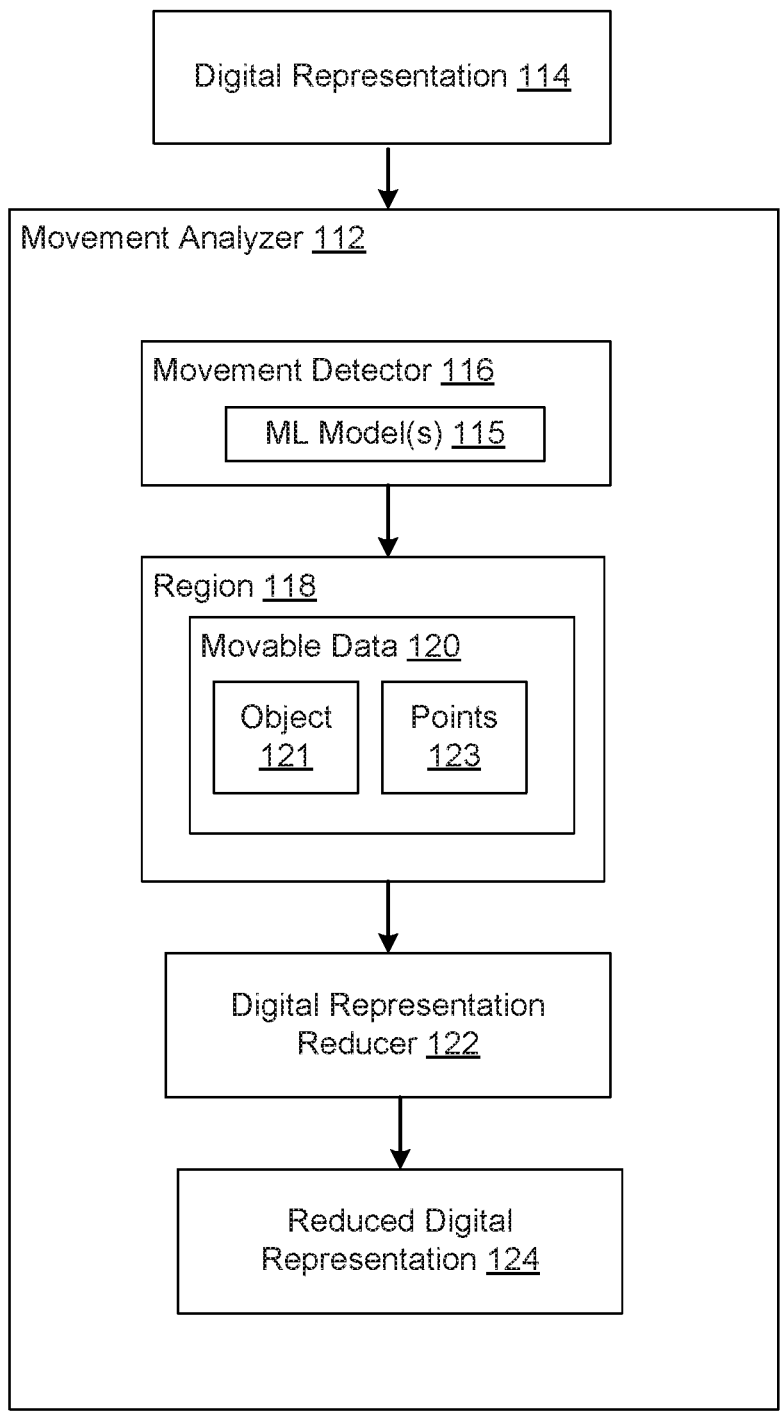
FIG. 1B illustrates a movement analyzer of the AR system for detecting moving data according to an aspect.

FIGS. 1A and 1B illustrates an augmented reality (AR) system 100 configured to store and share digital content in an AR environment 101 according to an aspect. The AR system 100 is configured to create a three-dimensional (3D) map 113 of the AR environment 101 without one or more visual objects (or one or more sets of patterned visual points) that are likely to change (e.g., move from the scene, disappear from the scene, or cause a change to the scene over time), thereby increasing the quality of persistent world-space mapping of the AR system 100. In some examples, the 3D map 113 includes the objects that are identified as likely to move, but the objects that are identified as likely to move are annotated in the AR system 100. In some examples, the 3D map 113 includes a coordinate space in which visual information from the physical space and AR content 130 are positioned. In some examples, the visual information and AR content 130 positions are updated in the 3D map 113 from image frame to image frame. In some examples, the 3D map 113 includes a sparse point map. The 3D map 113 is used to share the AR environment 101 with one or more users that join the AR environment 101 and to calculate where each user's computing device is located in relation to the physical space of the AR environment 101 such that multiple users can view and interact with the AR environment 101.

The AR system 100 includes an AR collaborative service 104, executable by one or more AR servers 102, configured to create a multi-user or collaborative AR experience that users can share. The AR collaborative service 104 communicates, over a network 150, with a plurality of computing devices including a first computing device 106 and a second computing device 108, where a user of the first computing device 106 and a user of the second computing device 108 may share the same AR environment 101. Each of the first computing device 106 and the second computing device 108 is configured to execute a client AR application 110.

In some examples, the client AR application 110 is a software development kit (SDK) that operates in conjunction with one or more AR applications. In some examples, in combination with one or more sensors on the first computing device 106 or the second computing device 108, the client AR application 110 is configured to detect and track a device's position relative to the physical space, detect the size and location of different types of surfaces (e.g., horizontal, vertical, angled), and estimate the environment's current lighting conditions. The client AR application 110 is configured to communicate with the AR collaborative service 104 via one or more application programming interfaces (APIs). Although two computing devices are illustrated in FIG. 1A, the AR collaborative service 104 may communicate and share the AR environment 101 with any number of computing devices.

The first computing device 106 may be, for example, a computing device such as a controller, or a mobile device (e.g., a smartphone, a tablet, a joystick, or other portable controller(s)). In some examples, the first computing device 106 includes a wearable device (e.g., a head mounted device) that is paired with, or communicates with a mobile device for interaction in the AR environment 101. The AR environment 101 is a representation of an environment that may be generated by the first computing device 106 (and/or other virtual and/or augmented reality hardware and software). In this example, the user is viewing the AR environment 101 with the first computing device 106. Since the details and use of the second computing device 108 may be the same with respect to the first computing device 106, the details of the second computing device 108 are omitted for the sake of brevity.

The AR environment 101 may involve a physical space which is within the view of a user and a virtual space within which AR content 130 is positioned. As shown in FIG. 1A, the AR content 130 is a text description ("My Chair") along with an arrow that points to a chair 131, where the chair 131 is a physical object in the physical space. Providing (or rendering) the AR environment 101 may then involve altering the user's view of the physical space by displaying the AR content 130 such that it appears to the user to be present in, or overlayed onto or into, the physical space in the view of the user. This displaying of the AR content 130 is therefore according to a mapping (e.g. the 3D map 113) between the virtual space and the physical space. Overlaying of the AR content 130 may be implemented, for example, by superimposing the AR content 130 into an optical field of view of a user of the physical space, by reproducing a view of the user of the physical space on one or more display screens, and/or in other ways, for example by using heads up displays, mobile device display screens and so forth.

The first computing device 106 may send a digital representation 114 of a scene 125 of the AR environment 101 to the AR collaboration service 104. The AR collaboration service 104 may create the 3D map 113 based on the digital representation 114 from the first computing device 106, and the 3D map 113 is stored at the AR server 102. Then, a user of the second computing device 108 may wish to join the AR environment 101 (e.g., at a time where the user of the first computing device 106 is within the AR environment 101 or at a subsequent time when the user of the first computing device 106 has left the session). In order to localize the AR environment 101 on the second computing device 108, the second computing device 108 may send a digital representation 114 of at least a portion of the scene 125 of the AR environment 101. The AR collaboration service 104 may compare the digital representation 114 from the second computing device 108 to the 3D map 113. If the comparison results in a match (or substantially matches), the AR environment 101 is localized on the second computing device 108.

The accuracy of the matching may be dependent upon whether the saved area (e.g., the 3D map 113) includes objects or points that are likely to move. Certain environment conditions (e.g., changes in lighting, movement of objects such as furniture, etc.) may result in visual differences in the camera frame. For example, some types of objects are more likely to be stable long-term (e.g., walls, counters, tables, shelves) while some type of objects are more likely to be moved regularly (e.g., chairs, people in the room, etc.). If the difference between the 3D map 113 (e.g., when the AR environment 101 was initially created) and the digital representation 114 from the second computing device 108 is above a threshold amount, the comparison may not result in a match, and the AR environment 101 may not be able to be localized on the second computing device 108.

As shown in FIG. 1A, the AR environment 101 includes a chair 131, and the 3D map 113 provides a 3D mapping of the AR environment 101 that includes the chair 131. However, after the creation of the 3D map 113, the chair 131 may be moved outside of the office depicted in the scene 125 of the AR environment 101. In response to an attempt to localize the AR environment 101 on the second computing device 108, the digital representation 114 sent to the AR collaboration service 104 from the second computing device 108 may not have visual features corresponding to the chair 131. When resolving the 3D map 113 against the digital representation 114 from the second computing device 108, the comparison of visual features may fail on account of the differences in visual features of when the scene 125 was initially stored and the later attempt to localize the AR environment 101.

However, the AR system 100 includes a movement analyzer 112 configured to detect objects or a set of patterned points that are likely to move from image data captured by the first computing device 106 or the second computing device 108, and then remove or annotate those objects or points when creating the 3D map 113 or ignoring those objects or points when attempting to match to the 3D map 113 for AR localization of the AR environment 101 on the first computing device 106 or the second computing device 108. In some examples, the operations of the movement analyzer 112 are performed by the client AR application 110. In some examples, the operations of the movement analyzer 112 are performed by the AR collaboration service 104. In some examples, one or more operations of the movement analyzer 112 are performed by the client AR application 110 and one or more operations of the movement analyzer 112 are performed by the AR collaboration service 104.

Referring to FIGS. 1A and 1B, the movement analyzer 112 is configured to detect a digital representation 114 of the scene 125 of the AR environment 101. For example, a user may use one or more sensors on the first computing device 106 to capture the scene 125 from the physical space of the AR environment 101. In some examples, the digital representation 114 includes a 3D representation of the scene 125 of the AR environment 101. In some examples, the digital representation 114 includes visual features with depth information. In some examples, the digital representation 114 includes image data of one or more frames captured by the first computing device 106. In some examples, the digital representation 114 includes a set of visual feature points with depth in space.

The movement analyzer 112 includes a movement detector 116 configured to identify, using one or more machine learning (ML) models 115, a region 118 having movable data 120 based on an analysis of the digital representation 114, which may be 2D image data or 3D image data with depth information. In some examples, the movable data 120 includes data that is likely to cause a change to the scene (e.g., anything that causes a "change" such as ice melting, a shadow or light moving). The movable data 120 may be one or more objects 121 or a patterned set of visual points 123 that are identified as likely to move, and the region 118 may be space that includes the movable data 120. In some examples, the region 118 is a 3D space that includes the objects 121 or the patterned set of visual points 123. In some examples, the region 118 is the area (e.g., 3D space) identified by one or more coordinates and/or dimensions of the region 118 in the AR environment 101 that encompass the objects 121 or the patterned set of visual points 123. In some examples, the region 118 is a bounding box that includes the objects 121 or the patterned set of visual points 123.

In some examples, the ML models 115 include one or more trained classifiers configured to detect a classification of an object 121 in the scene 125 based on the digital representation 114. For example, the one or more trained classifiers may detect an object 121 in the scene 125, and classify the object 121 into one of a plurality of classifications. For example, the classifications may include different characterizations of objects such as chairs, laptops, desks, etc. Some of the classifications may be associated with a tag indicating that objects belonging to a corresponding classification are likely to move.

In some examples, a classification being tagged as likely to be moved may be programmatically determined by one or more of the ML models 115. For example, the trained classifiers may indicate that objects of a particular classification move out of the scene 125 (or a different location in the scene 125) over a threshold amount, and this particular classification may be programmatically tagged as likely to be moved. In some examples, a classification being tagged as likely to be moved may be determined by a human programmer (e.g., it is known that objects such as pens, laptops, chairs, etc. are likely to move, and may be manually tagged as likely to move without using ML algorithms). As shown in FIG. 1A, the scene 125 includes the chair 131. The movement detector 116 may detect the object representing the chair 131 and classify the chair 131 as a chair classification, and the chair classification may be tagged as likely to be moved. In some examples, the detection of the chair 131 as the chair classification is associated with a confidence level, and if the confidence level is above a threshold amount, the movement detector 116 is configured to detect the chair 131 as the chair classification. The movement detector 116 may then identify the region 118 that encompasses the chair 131.

In some examples, the movement detector 116 determines a classification for a detected object 121 using a 2D or 3D image signal and one or more other signals such as information associated with the AR content 130. The AR content 130 may include descriptive information that can assist in the semantic understanding of the object 121. In some examples, as indicated above, the digital representation 114 may be a set of visual feature points with depth information in space, and one or more of the set of visual feature points may be associated with the AR content 130. As shown in FIG. 1A, the chair 131 is associated with the AR content 130 (e.g., "My chair"). In some examples, the movement detector 116 may be configured to analyze any AR content 130 associated with the objects 121 of the scene 125, and increase or decrease the confidence level associated with the classification. In this example, since the AR content 130 includes the word "Chair," the movement detector 116 may increase the confidence level that the chair 131 is the chair classification.

In some examples, the movement detector 116 is configured to identify, using the ML models 115, a patterned set of visual points 123 as likely to move. For example, the movement detector 116 may not necessarily detect the particular type of object, but rather the movement detector 116 may detect a pattern of visual points that have one or more characteristics in which the ML models 115 determine as likely to move.

In some examples, the ML models 115 include a neural network. The neural network may be an interconnected group of nodes, each node representing an artificial neuron. The nodes are connected to each other in layers, with the output of one layer becoming the input of a next layer. Neural networks transform an input, received by the input layer, transform it through a series of hidden layers, and produce an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process.

In some examples, the movement analyzer 112 uses a convolutional neural network in the object classification algorithm, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

The movement analyzer 112 includes a digital representation reducer 122 configured to remove or annotate a portion of the digital representation 114 that corresponds to the region 118 to obtain a reduced (or annotated) digital representation 124. The reduced (or annotated) digital representation 124 excludes the objects 121 or the patterned set of visual points 123 that are identified as likely to move or annotates them as likely to move. In some examples, as indicated above, the digital representation 114 is a set of visual feature points with depth information in space, and the digital representation reducer 122 may remove or annotate one or more visual feature points that are contained in the region 118 such that the objects 121 or the patterned set of visual points 123 are not included or annotated in the reduced (or annotated) digital representation 124.

FIG. 2 illustrates an AR system 200 for creating a 3D map 213 without one or more objects that are likely to move, thereby increasing the quality of persistent world-space mapping of the AR system 200. In some examples, the 3D map 213 includes the objects that are identified as likely to move, but the objects that are identified as likely to move are annotated in the AR system 200. The AR system 200 of FIG. 2 may include any of the features of the AR system 100 of FIGS. 1A and 1B.

The AR system 200 includes an AR collaborative service 204, executable by one or more AR servers 202, configured to communicate, over a network 250, with a plurality of computing devices including a first computing device 206 and a second computing device 208, where a user of the first computing device 206 and a user of the second computing device 208 may share the same AR environment (e.g., the AR environment 101 of FIG. 1). Each of the first computing device 206 and the second computing device 208 is configured to execute a client AR application 210. The client AR application 210 is configured to communicate with the AR collaborative service 204 via one or more application programming interfaces (APIs)

As shown in FIG. 2, the AR system 200 includes a movement analyzer 212 included within the client AR application 210. The movement analyzer 212 may include any of the features discussed with reference to the movement analyzer 112 of FIGS. 1A and 1B. The client AR application 210 of the first computing device 206 obtains a first digital representation (e.g., the digital representation 114 of FIG. 1B) of the scene (e.g., the scene 125), and then processes the first digital representation (using the operating of the movement analyzer 212) to obtain a first reduced (or annotated) digital representation 224-1. The client AR application 210 sends the reduced (or annotated) digital representation 224-1, over the network 250, to the AR collaborative service 204.

The AR collaborative service 204 generates the 3D map 213 using the first reduced (or annotated) digital representation 224-1. For example, the AR collaborative service 204 includes a map generator 226 configured to generate the 3D map 213 using the first reduced (or annotated) digital representation 224-1. The map generator 226 stores the 3D map 213 in a database 228 at the AR server 202.

The client AR application 210 of the second computing device 208 obtains a second digital representation (e.g., the digital representation 114) of the scene (e.g., the scene 125), and then processes the second digital representation (using the operating of the movement analyzer 212) to obtain a second reduced (or annotated) digital representation 224-2. The client AR application 210 of the second computing device 208 sends the second reduced (or annotated) digital representation 224-2, over the network 250, to the AR collaborative service 204.

The AR collaborative service 204 includes a localization resolver 230 configured to compare the second reduced (or annotated) digital representation 224-2 to the 3D map 213 when attempting to localize the AR environment on the second computing device 208. In response to the comparison resulting in a match (e.g., indicating that the 3D map 213 and the second reduced (or annotated) digital representation 224-2 is from the same AR environment), the AR collaborative service 204 provides the AR environment to the client AR application 210 of the second computing device 208. Also, the map generator 226 may update the 3D map 213 using the second reduced (or annotated) digital representation 224-2. In response to the comparison not resulting in a match (e.g., indicating that AR localization has failed), the AR environment is not shared with the user of the second computing device 208. However, since the 3D map 213 does not include movable data or the movable data is annotated in the 3D map 213 (and the second reduced digital representation 224-2 does not include movable data or the movable data is annotated in the second reduced digital representation 224-2), the accuracy of the comparison may be improved.

Figure 3:
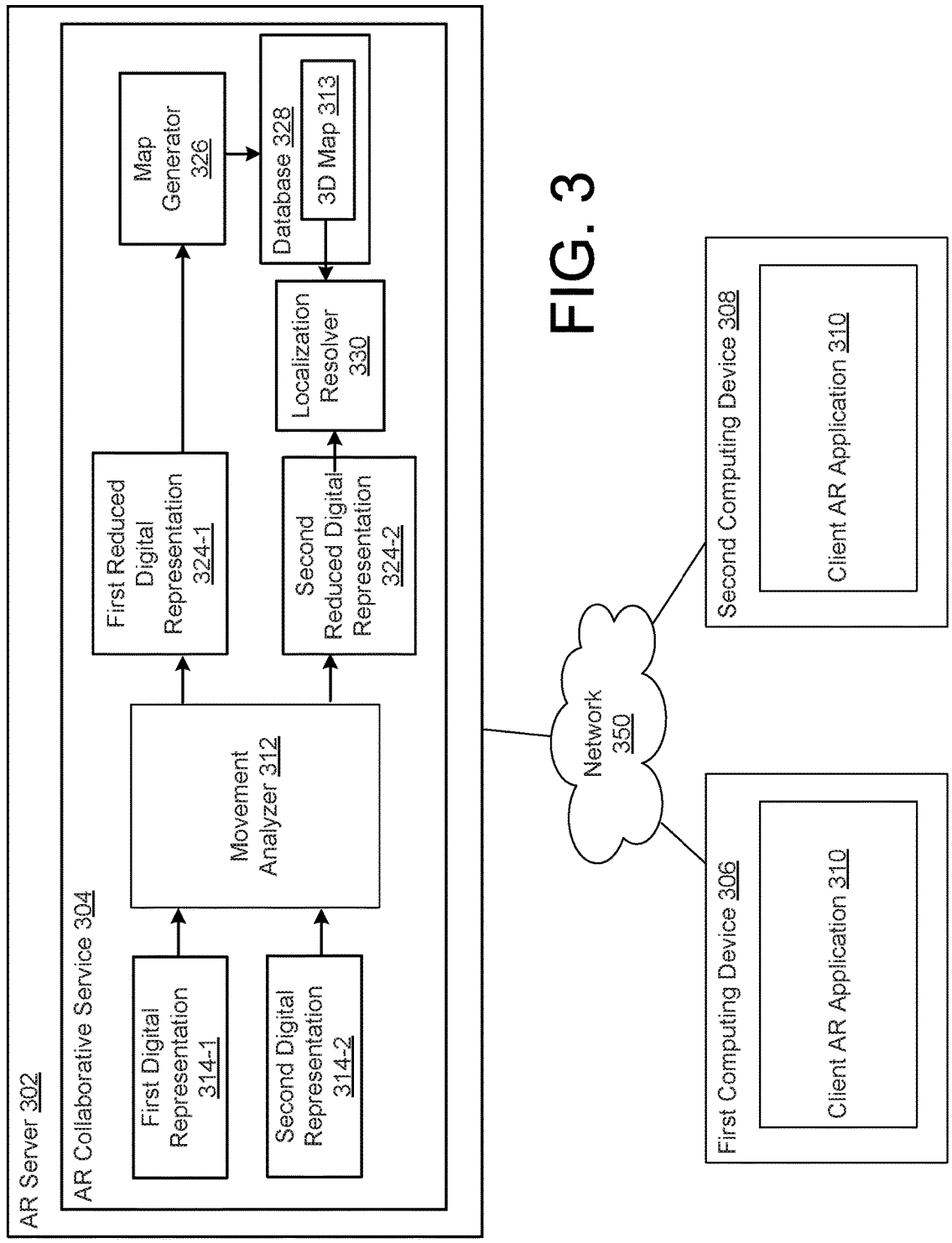
FIG. 3 illustrates an AR system with the movement analyzer integrated at an AR server according to an aspect.

FIG. 3 illustrates an AR system 300 for creating a 3D map 313 without one or more objects that are likely to move, thereby increasing the quality of persistent world-space mapping of the AR system 300. In some examples, the 3D map 313 includes the objects that are identified as likely to move, but the objects that are identified as likely to move are annotated in the AR system 300. The AR system 300 of FIG. 3 may include any of the features of the AR system 100 of FIGS. 1A and 1B.

The AR system 300 includes an AR collaborative service 304, executable by one or more AR servers 302, configured to communicate, over a network 350, with a plurality of computing devices including a first computing device 306 and a second computing device 308, where a user of the first computing device 306 and a user of the second computing device 308 may share the same AR environment (e.g., the AR environment 101 of FIG. 1). Each of the first computing device 306 and the second computing device 308 is configured to execute a client AR application 310. The client AR application 310 is configured to communicate with the AR collaborative service 304 via one or more application programming interfaces (APIs).

As shown in FIG. 3, the AR system 300 includes a movement analyzer 312 included within the AR collaborative service 304 that executes on the AR server 302. The movement analyzer 312 may include any of the features discussed with reference to the movement analyzer 112 of FIGS. 1A and 1B. The client AR application 310 of the first computing device 306 obtains a first digital representation 314-1 (e.g., the digital representation 114 of FIG. 1B) of the scene (e.g., the scene 125) and sends the first digital representation 314-1, over the network 350, to the AR collaborative service 304. The movement analyzer 312 is configured to process the first digital representation 314-1 (using the movement analyzer 312) to obtain a first reduced (or annotated) digital representation 324-1 that does not include movable data, or the movable data is annotated in the digital representation 324-1. The AR collaborative service 304 generates the 3D map 313 using the first reduced (or annotated) digital representation 324-1. For example, the AR collaborative service 304 includes a map generator 326 configured to generate the 3D map 313 using the first reduced digital representation 324-1. The map generator 326 stores the 3D map 313 in a database 328 at the AR server 302.

The client AR application 310 of the second computing device 308 obtains a second digital representation 314-2 (e.g., the digital representation 114) of the scene (e.g., the scene 125), and sends the second digital representation 314-2, over the network 350, to the AR collaborative service 304. The movement analyzer 312 processes the second digital representation 314-2 to obtain a second reduced (or annotated) digital representation 324-2, which does not include movable data or the movable data is annotated in the digital representation 324-2.

The AR collaborative service 304 includes a localization resolver 330 configured to compare the second reduced (or annotated) digital representation 324-2 to the 3D map 313 when attempting to localize the AR environment on the second computing device 308. In response to the comparison resulting in a match (e.g., indicating that the 3D map 313 and the second reduced digital representation 324-2 is from the same AR environment), the AR collaborative service 304 provides the AR environment to the client AR application 310 of the second computing device 308. Also, the map generator 326 may update the 3D map 313 using the second reduced (or annotated) digital representation 324-2. In response to the comparison not resulting in a match (e.g., indicating that AR localization has failed), the AR environment is not shared with the user of the second computing device 308. However, since the 3D map 313 does not include movable data (and the second reduced digital representation 324-2 does not include movable data), the accuracy of the comparison may be improved.

FIG. 4 illustrates an AR system 400 for creating a 3D map 432 without one or more objects that are likely to move, thereby increasing the quality of persistent world-space mapping of the AR system 400. The AR system 400 of FIG. 4 may include any of the features of the previous figures.

The AR system 400 includes an AR collaborative service 404, executable by one or more AR servers 402, configured to communicate, over a network 450, with a plurality of computing devices including a first computing device 406 and a second computing device 408, where a user of the first computing device 406 and a user of the second computing device 408 may share the same AR environment (e.g., the AR environment 101 of FIG. 1). Each of the first computing device 406 and the second computing device 408 is configured to execute a client AR application 410. The client AR application 410 is configured to communicate with the AR collaborative service 404 via one or more application programming interfaces (APIs).

The client AR application 410 of the first computing device 406 obtains a first digital representation 414-1 (e.g., the digital representation 114 of FIG. 1B) of the scene (e.g., the scene 125) and sends the first digital representation 414-1, over the network 450, to the AR collaborative service 404. The AR collaborative service 404 includes a map generator 426 configured to generate a first 3D map 413-1 based on the first digital representation 414-1. The client AR application 410 of the second computing device 408 obtains a second digital representation 414-2 (e.g., the digital representation 114 of FIG. 1B) of the scene (e.g., the scene 125) and sends the second digital representation 414-2, over the network 450, to the AR collaborative service 404. The map generator 426 configured to generate a second 3D map 413-2 based on the second digital representation 414-2.

The AR collaborative service 404 includes a movement analyzer 412 configured to compare the first 3D map 413-1 to the second 3D map 413-2 to identify one or more objects or one or more patterned sets of visual points that are present in one of the 3D maps but not present in the other 3D maps. The movement analyzer 412 may identify these objects or patterned sets of visual points as likely to remove. The movement analyzer 412 may generate and store the 3D map 432 based on the first 3D map 413-1 and the second 3D map 413-2 in a manner that does not include the objects or patterned sets of visual points that are likely to move.

Figure 5:
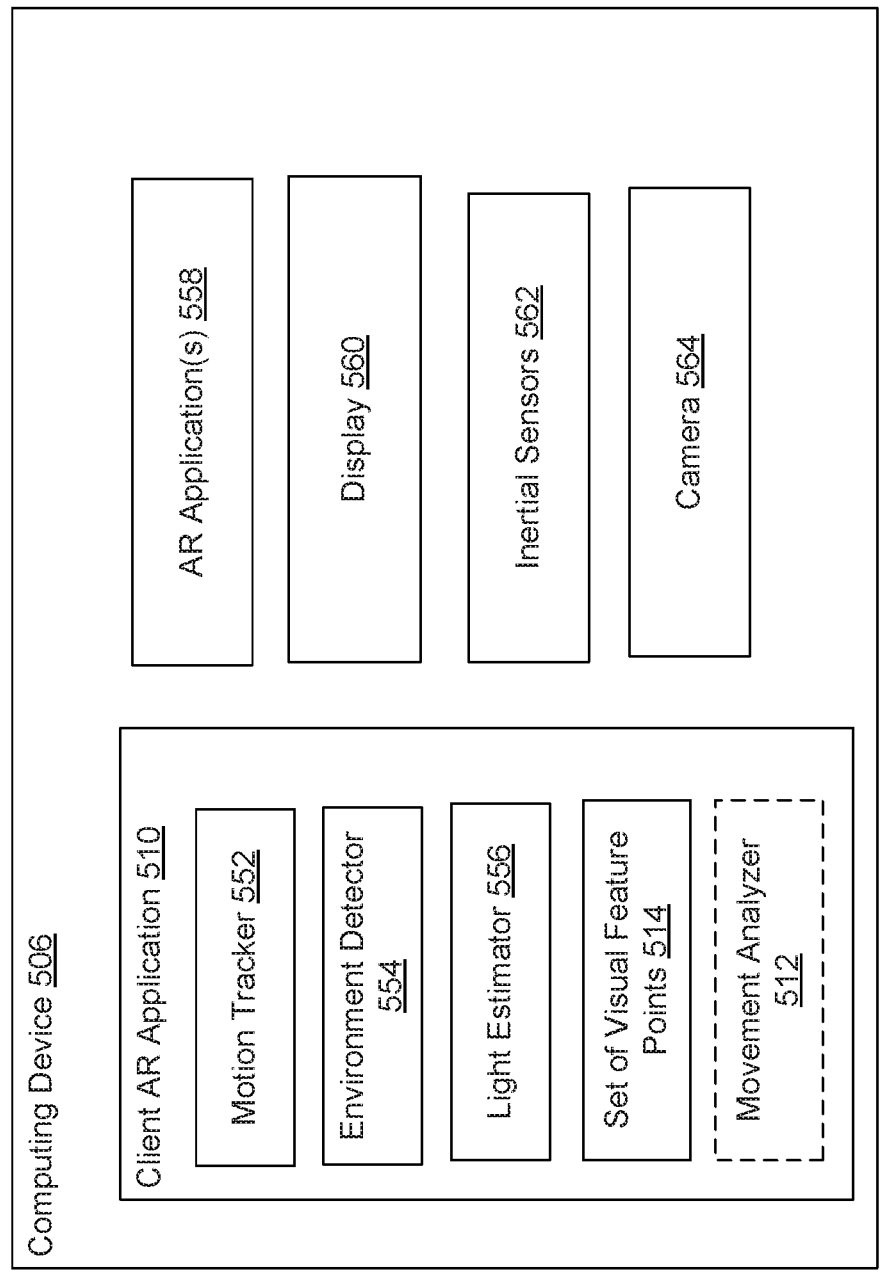
FIG. 5 illustrates an example of a computing device of an AR system according to an aspect.

FIG. 5 illustrates an example of a computing device 506 configured to communicate with any of the AR system disclosed herein. The computing device 506 may be an example of the first computing device (e.g., 106, 206, 306, 406) or the second computing device (e.g., 108, 208, 308, 408). The computing device 506 may include any of the features discussed with reference to the first computing device or the second computing device with reference to the previous figures.

The computing device 506 includes a client AR application 510 configured to execute on an operating system of the computing device 506. In some examples, the client AR application 510 is a software development kit (SDK) that operates in conjunction with one or more AR applications 558. The AR applications 558 may be any type of AR applications (e.g., gaming, entertainment, medicine, education, etc.) executable on the computing device 506.

The client AR application 510 includes a motion tracker 552 configured to permit the computing device 506 to detect and track its position relative to the physical space, an environment detector 554 configured to permit the computing device 506 to detect the size and location of different types of surfaces (e.g., horizontal, vertical, angled), and a light estimator 556 to permit the computing device 506 to estimate the environment's current lighting conditions. Although the computing device 506 is discussed with reference to the AR system 100 of FIGS. 1A and 1B, it is noted that the computing device 506 may be used within any of the AR system described herein. The computing device 506 includes a display 560, one or more inertial sensors 562, and a camera 564.

Using the motion tracker 552, the environment detector 554, and the light estimator 556, the client AR application 510 is configured to generate a set of visual feature points 514 to be sent and stored on the AR server 102 for future AR localization. The user may use the camera 564 on the computing device 506 to capture a scene from the physical space (e.g. moving the camera around to capture a specific area), and the client AR application 510 is configured to detect the set of visual feature points 514 and track the movement of the set of visual feature points 514 move over time. For example, with a combination of the movement of the set of visual feature points 514 and readings from the inertial sensors 562 on the computing device 506, the client AR application 510 is configured to determine the position and orientation of the computing device 506 as the computing device 506 moves through the physical space. In some examples, the client AR application 510 may detect flat surfaces (e.g., a table or the floor) and estimate the average lighting in the area around it.

The set of visual feature points 514 may be an example of the digital representation 114. In some examples, the set of visual feature points 514 are a plurality of points (e.g., interesting points) that represent the user's environment. In some examples, each visual feature point 514 is an approximation of a fixed location and orientation in the physical space, and the set of visual feature points 514 may be updated over time.

In some examples, the set of visual feature points 514 may be referred to an anchor or a set of persistent visual features that represent physical objects in the physical world. For example, the set of visual feature points 514 may be used to localize the AR environment for a secondary user or localize the AR environment for the computing device 506 in a subsequent session. For example, the visual feature points 514 may be used to compare and match against other visual feature points 514 captured by a secondary computing device in order to determine whether the physical space is the same as the physical space of the stored visual feature points 514 and to calculate the location of the secondary computing device within the AR environment in relation to the stored visual feature points 514.

In some examples, AR content 130 is attached to the one of more of the visual feature points 514. The AR content 130 may include objects (e.g., 3D objects), annotations, or other information. For example, the user of the computing device 506 can place a napping kitten on the corner of a coffee table, or annotate a painting with biographical information about the artist. Motion tracking means that you can move around and view these objects from any angle, and even if you turn around and leave the room, when you come back, the kitten or annotation will be right where you left it.

In some examples, the client AR application 510 includes a movement analyzer 512. The movement analyzer 512 is configured to process the set of visual feature points 514 to remove one or more visual feature points 514 that are included within a 3D region encompassing an object or a set of patterned visual points that are identified as likely to move by the ML models. The client AR application 510 is configured to send the reduced set of visual feature points 514 to the AR collaboration service 104 for storage thereon and/or the generation of the 3D map 113. In some examples, the client AR application 510 does not include the movement analyzer 512, but rather the movement analyzer 512 executes on the AR collaboration service 104 as described above. In this case, the client AR application 510 sends the full set of visual feature points 514 to the AR collaboration service 104.

In further detail, if the movement analyzer 512 determines that one or more visual feature points 514 in the set corresponds to an object 121 that is likely to move, the movement analyzer 512 may remove those visual feature points 514 in the set of visual feature points 514. In some examples, the movement analyzer 512 uses the ML models 115 to identify a region 118 (e.g., a bounding box) of an object 121 likely to move in a given image, and the movement analyzer 512 is configured to determine which of the visual feature points 514 are contained in that region 118, and then remove those visual feature points 514 contained in the region 118.

Figure 6A:
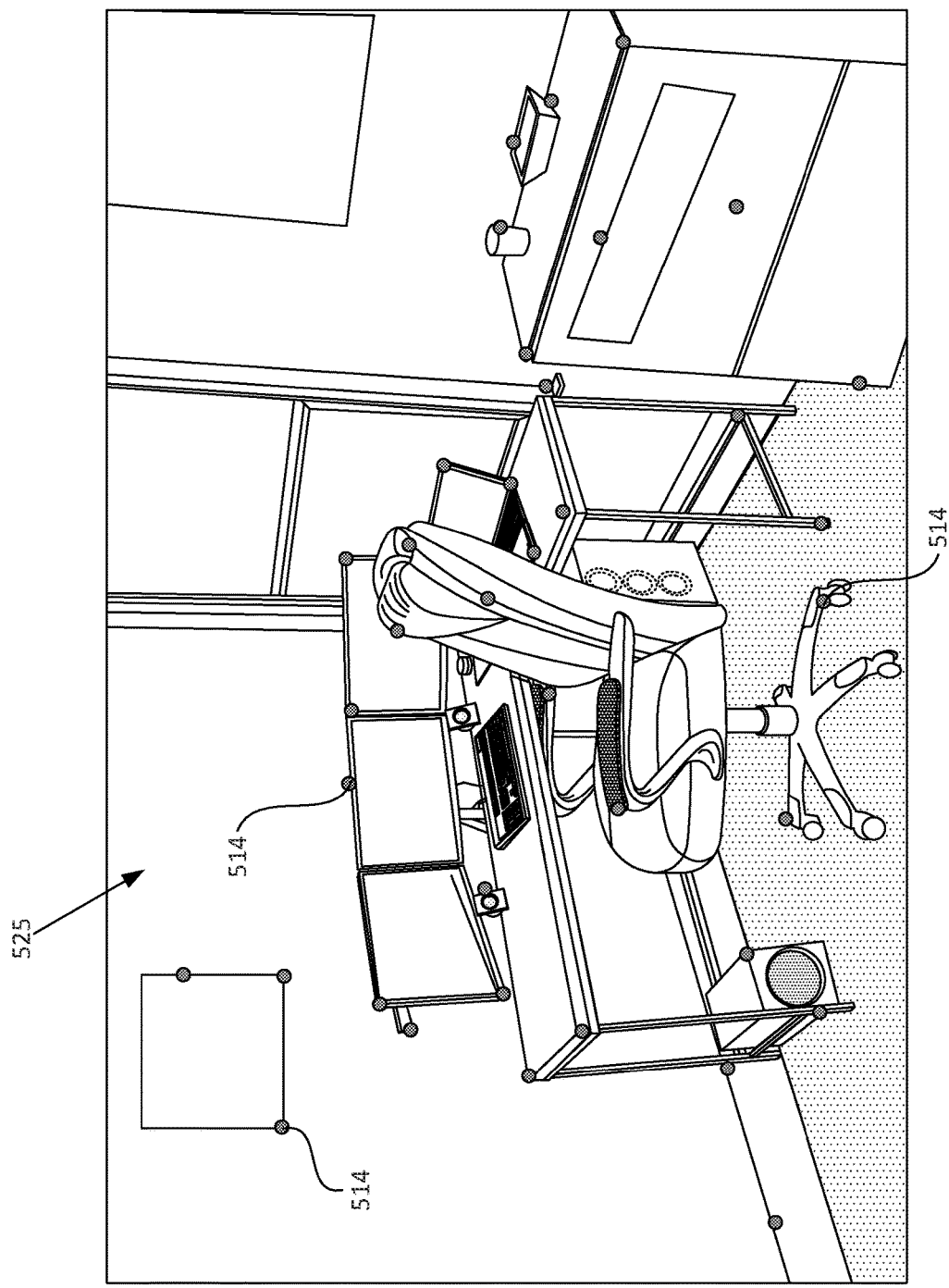
FIGS. 6A through 6C illustrate graphical depictions of visual feature points on a scene of an AR environment and the removal of one or more of the points for a region having moving data according to an aspect.
Figure 6B:
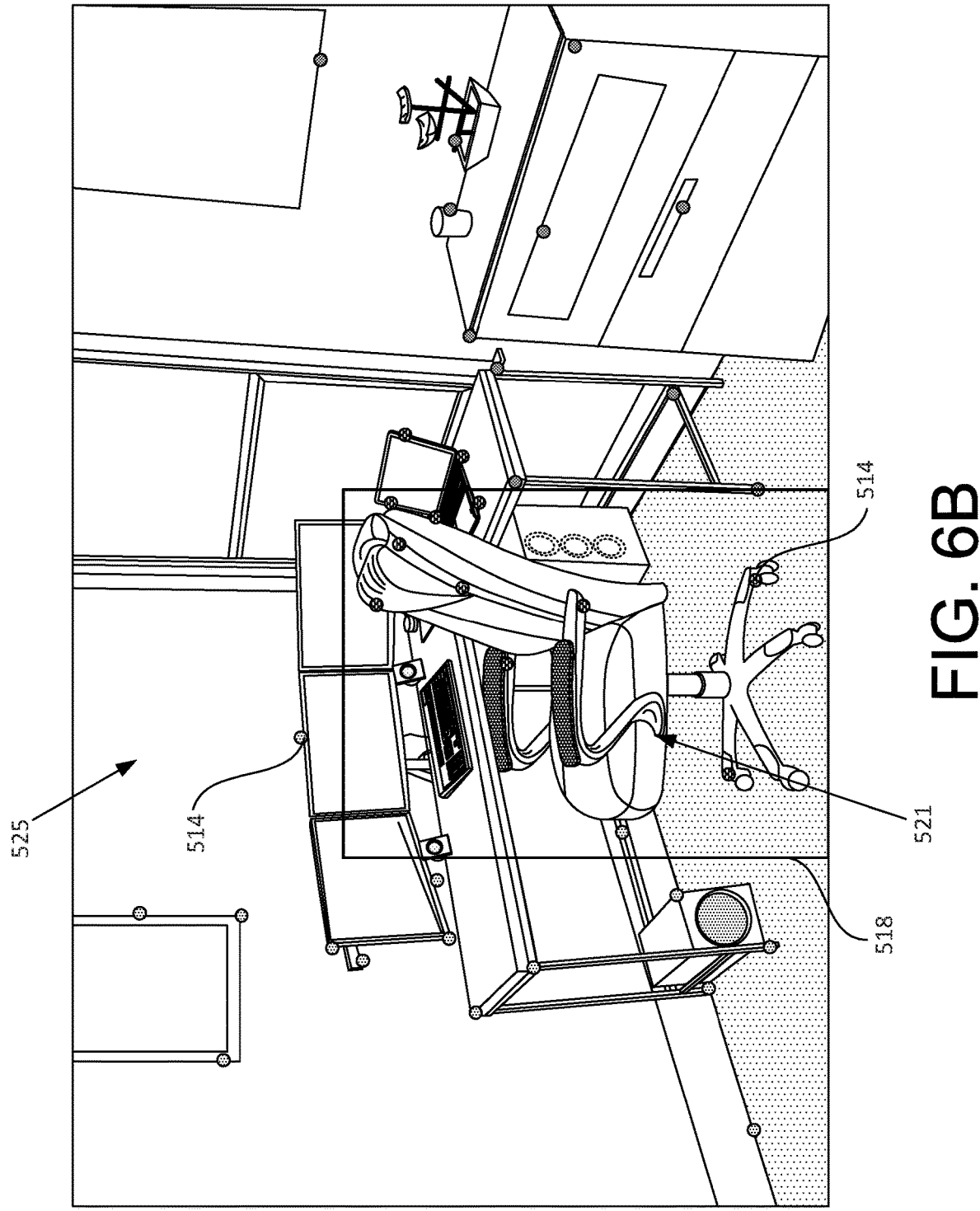
Figure 6C:
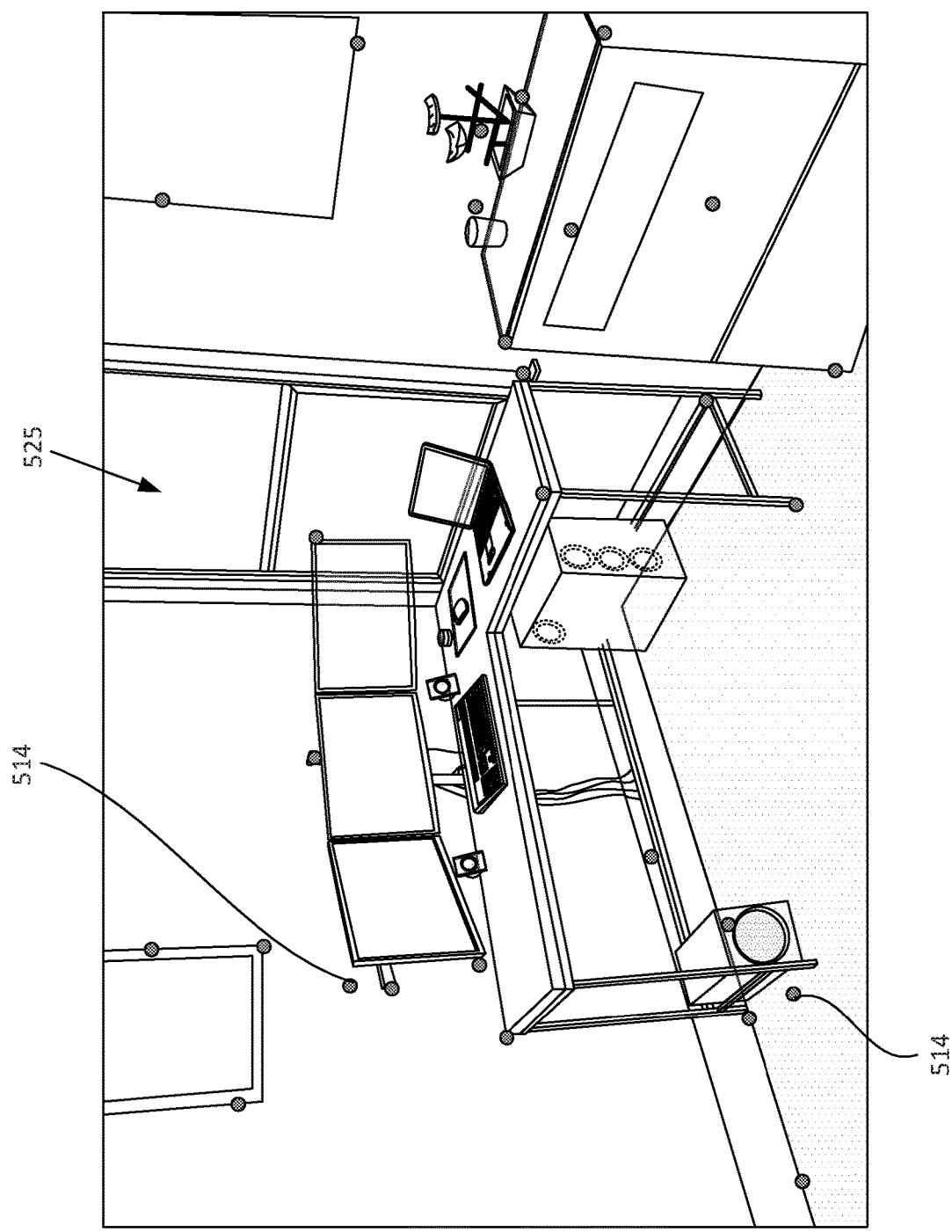

FIGS. 6A through 6C depict examples of the set of visual feature points 514 in a scene 525 of an AR environment and the removal of one or more visual feature points 514 that correspond to an object identified as likely to move according to an aspect. For example, as shown in FIG. 6A, the client AR application 510 is configured to generate the set of visual feature points 514 that represent the scene 525 of the AR environment. As shown in FIG. 6B, the movement analyzer 512 is configured to detect an object 521 (e.g., the chair) as likely to move in the scene 525 in the manner as described above, and identify a region 518 that encompasses the object 521. As shown in FIG. 6C, the movement analyzer 512 is remove the visual feature points 514 that are included within the region 518 from the set of visual feature points 514.

Figure 7:
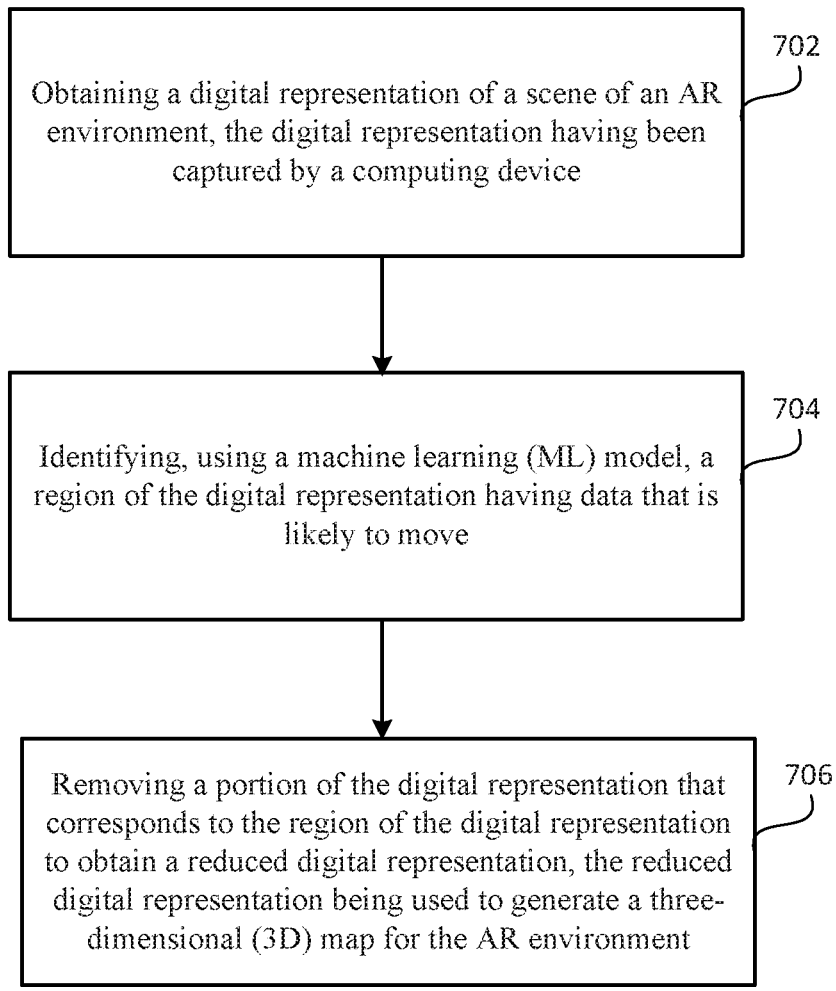
FIG. 7 illustrates a flowchart depicting example operations of an AR system according to an aspect.

FIG. 7 illustrates a flow chart 700 depicting example operations of an AR system according to an aspect. Although the operations are described with reference to the AR system 100, the operation of FIG. 7 may be applicable to any of the systems described herein.

Operation 702 includes obtaining a digital representation 114 of a scene 125 of an AR environment 101, where the digital representation 114 has been captured by a computing device (e.g., the first computing device 106). Operation 704 includes identifying, using a machine learning (ML) model 115, a region 118 of the digital representation 114 having data 120 that is likely to move. Operation 706 includes removing a portion of the digital representation 114 that corresponds to the region 118 of the digital representation 114 to obtain a reduced digital representation 124, where the reduced digital representation 124 is used to generate a three-dimensional (3D) map 113 for the AR environment 101.

Figure 8:
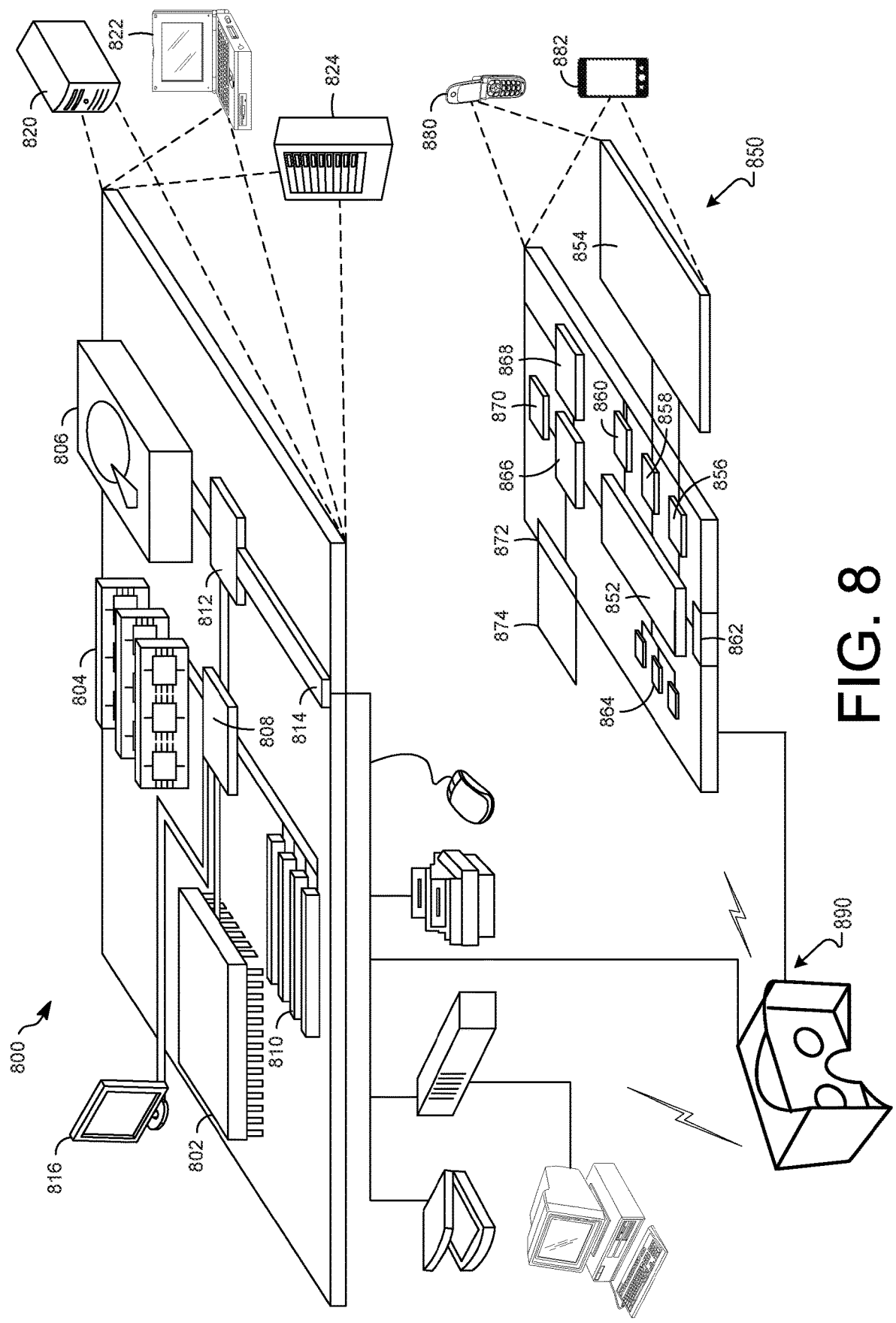
FIG. 8 illustrates example computing devices of the AR system according to an aspect.

FIG. 8 shows an example of an example computer device 800 and an example mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for creating a three-dimensional map for augmented reality (AR) localization, the method comprising:
    obtaining a first digital representation of a scene of an AR environment, the first digital representation having been captured by a first computing device associated with a first user;
    identifying, using a machine learning (ML) model and the first digital representation, a physical object that is likely to move;
    removing one or more visual feature points that represent the physical object from the first digital representation to obtain a reduced digital representation;
    generating a three-dimensional (3D) map based on the reduced digital representation; and
    localizing the AR environment on a second computing device associated with a second user, including:
        obtaining a second digital representation from the second computing device; and
        executing a comparison of the 3D model with the second digital representation such that a virtual object from the 3D model is rendered on a user interface of the second computing device in response to the comparison resulting in a match.

2. The method of claim 1, wherein the identifying includes:
    determining a classification of the physical object;
    obtaining a tag associated with the classification, the tag indicating that physical objects belonging to the classification are likely to move; and
    marking the physical object as likely to move based on the tag.

3. The method of claim 2, wherein the tag is programmatically determined by the ML model.

4. The method of claim 1, wherein the 3D map identifies a location of the virtual object in a coordinate space of the 3D model, the virtual object having been added by the first user.

5. The method of claim 1,
    wherein the virtual object is overlayed onto an optical field of view of a camera on the second computing device.

6. The method of claim 1, wherein the localizing the AR environment includes:
    identifying, using the ML model and the second digital representation, a secondary physical object that is likely to move;
    removing one or more visual feature points that represent the secondary physical object from the second digital representation to obtain a secondary reduced digital representation; and
    executing a comparison of the 3D model with the secondary reduced digital representation to determine that the secondary reduced digital representation corresponds to a physical space associated with the first digital representation.

7. An augmented reality (AR) system configured to generate a three-dimensional (3D) map for an AR environment, the AR system comprising:
    an AR collaborative service executable by at least one server, the AR collaborative service configured to provide an AR environment in which multiple users can view and interact with one or more virtual objects positioned within a physical space; and
    a client AR application executable by a first or second computing device, the client AR application configured to communicate with the AR collaborative service via one or more application programming interfaces (APIs), the AR collaborative service or the client AR application configured to:
        obtain a first digital representation of a scene of the AR environment, the first digital representation having been captured by the first computing device associated with a first user;
        identify, using a machine learning (ML) model and the first digital representation, a physical object that is likely to move;
        remove one or more visual feature points that represent the physical object from the first digital representation to obtain a reduced digital representation;
        generate a three-dimensional (3D) map based on the reduced digital representation; and
        localize the AR environment on the second computing device associated with a second user, including:
            obtain a second digital representation from the second computing device;
            execute a comparison of the 3D model with the second digital representation to determine that the second digital representation corresponds to a physical space associated with the first digital representation; and
            render, in response to the comparison resulting in a match, a virtual object on a user interface of the second computing device such that the virtual object is overlayed onto an optical field of view of a camera on the second computing device.

8. The AR system of claim 7, wherein the AR collaborative service is configured to:
    determine a classification of the physical object;
    obtain a tag associated with the classification, the tag indicating that physical objects belonging to the classification are likely to move; and
    mark the physical object as likely to move based on the tag.

9. The AR system of claim 8, wherein the tag is programmatically determined by the ML model.

10. The AR system of claim 7, wherein the client AR application or the AR collaborative service is configured to:
    identify, using the ML model and the second digital representation, a secondary physical object that is likely to move;
    remove one or more visual feature points that represent the secondary physical object from the second digital representation to obtain a secondary reduced digital representation; and
    execute a comparison of the 3D model with the secondary reduced digital representation to determine that the secondary reduced digital representation corresponds to the physical space associated with the first digital representation.

11. A non-transitory computer-readable medium storing executable instructions that when executed by at least one processor are configured to generate a three-dimensional (3D) for an augmented reality (AR) environment, the executable instructions including instructions that cause the at least one processor to:
    obtain a first digital representation of a scene of an AR environment in which multiple users can view and interact with one or more virtual objects, the first digital representation having been captured by a first computing device associated with a first user, the first digital representation including a set of visual feature points;

identify, using a machine learning (ML) model and the first digital representation, a physical object that is likely to move;

remove one or more visual feature points that represent the physical object from the set of visual feature points of the first digital representation to obtain a reduced digital representation;

generate a three-dimensional (3D) map based on the reduced digital representation, the 3D map identifying a location of a virtual object positioned in a coordinate space of the AR environment, the virtual object having been added by the first user; and localize the AR environment on a second computing device associated with a second user, including:
  obtain a second digital representation from the second computing device;
  execute a comparison of the 3D model with the second digital representation; and
  render, in response to the comparison resulting in a match, the virtual object in which the virtual object is overlayed onto an optical field of view of a camera on the second computing device.

12. The non-transitory computer-readable medium of claim 11, further comprising:
  determine a classification of the physical object;
  obtain a tag associated with the classification, the tag indicating that physical objects belonging to the classification are likely to move; and
  mark the physical object as likely to move based on the tag.

13. The non-transitory computer-readable medium of claim 12, wherein the tag is programmatically determined by the ML model.

14. The non-transitory computer-readable medium of claim 11, wherein the instructions to attempt to localize the AR environment includes:
  identify, using the ML model and the second digital representation, a secondary physical object that is likely to move;
  remove one or more visual feature points that represent the secondary physical object from the second digital representation to obtain a secondary reduced digital representation; and
  execute a comparison of the 3D model with the secondary reduced digital representation to determine that the secondary digital representation corresponds to a physical space associated with the first digital representation.

* * * * *